(12) United States Patent
Holcomb

(10) Patent No.: US 6,697,795 B2  
(45) Date of Patent: Feb. 24, 2004

(54) VIRTUAL FILE SYSTEM FOR DYNAMICALLY-GENERATED WEB PAGES

(75) Inventor: David Marshall Holcomb, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 09/873,878

(22) Filed: Jun. 4, 2001

(65) Prior Publication Data

US 2002/0184184 A1 Dec. 5, 2002

(51) Int. Cl.[7] .............................................. G06F 7/00
(52) U.S. Cl. .................. 707/2; 707/3; 707/4; 707/100; 707/104.1
(58) Field of Search .............................. 707/100–104.1, 707/1–10; 711/100, 117, 163

(56) References Cited

U.S. PATENT DOCUMENTS

| | | | | |
|---|---|---|---|---|
| 4,467,421 A | * | 8/1984 | White | 711/118 |
| 4,775,969 A | | 10/1988 | Osterlund | |
| 5,774,715 A | * | 6/1998 | Madany et al. | 707/101 |
| 5,991,753 A | * | 11/1999 | Wilde | 707/2 |
| 6,073,222 A | * | 6/2000 | Ohran | 711/162 |
| 6,081,883 A | | 6/2000 | Popelka et al. | |

FOREIGN PATENT DOCUMENTS

| | | |
|---|---|---|
| EP | 1041572 A2 | 10/2000 |
| WO | WO99/42934 | 8/1999 |
| WO | WO00/57315 | 9/2000 |

OTHER PUBLICATIONS

D. Makaroff and D. Eager, "Disk Cache Performance for Distributed Systems"Proceedings of the International Conference on Distributed Computing System. Paris, May 28–Jun. 1, 1990. Los Alamitos, IEEE Comp. Soc. Press, US, vol. CONF. 10, May 28, 1990, pp. 212–219, XP010019312 ISBN: 0–8186–2048–X.

* cited by examiner

Primary Examiner—Greta Robinson  
Assistant Examiner—Linh Black

(57) ABSTRACT

A virtual filesystem for allowing a large number of data files to be created, deleted, and rearranged by a peripheral device incorporating the filesystem without requiring the host computer system to delete and rebuild its cache and other file system tables. Since the directory hierarchy of the virtual filesystem is predefined, data blocks in the directory and file allocation table regions of the filesystem's filespace do not need to be prestored in memory, but rather are calculable at the time a data block read request is processed by the virtual filesystem. Since the specific location in the filesystem of a file is determined only at the time that one of a set of lowest-level directories which contains the file is accessed, host caching problems can be avoided by predefining a large number of files in the filesystem and avoiding reuse of any previously-used file. The data blocks of a file can be dynamically generated upon request, or can be aliased to corresponding data blocks of an auxiliary file system.

26 Claims, 7 Drawing Sheets

VIRTUAL FILE SYSTEM FOR DYNAMICALLY-GENERATED WEB PAGES

CROSS-REFERENCE TO RELATED APPLICATIONS

This application relates to the subject matter disclosed in the co-pending U.S. application Ser. No. 09/686,553, by Holcomb et al., filed Oct. 11, 2000, titled "Dynamically-Generated Web Pages". This application is assigned to the assignee of the present invention and is hereby incorporated by reference in its entirety.

FIELD OF THE INVENTION

The present invention relates generally to file systems for mass storage devices, and pertains more particularly to a virtual file system for a peripheral device that provides a large block-oriented mass storage device interface to a host system while using a much smaller amount of memory in the peripheral device and dynamically generating the data blocks read by the host.

BACKGROUND OF THE INVENTION

Mass storage peripherals, such as disk drives, are in common use in computer systems today for storing and retrieving data. This data is stored in blocks. Many different logical sets of data, commonly referred to as "files", can be stored on the peripheral. While the data blocks are typically of a fixed size, a file can contain more data than can fit in a single data block, and so a file may consist of a number of data blocks. In addition, the various data blocks that make up a file do not need to be located together, but rather can be stored in different places on the peripheral. In order to facilitate access to files of data by the computer system, mass storage peripherals typically provide a file system which describes the organization on the peripheral of the data blocks for each file.

With conventional mass storage peripherals, data blocks are read and written only under the explicit control of the computer system. In other words, the computer system can keep its own independent record of where certain data blocks and files are stored on the peripheral and be assured that, in fact, that is where the data blocks and files are located. In order to speed up the storage and retrieval of frequently used data blocks, computer systems also frequently implement a data block cache internal to the computer system itself that stores these frequently accessed data blocks. The computer system can read a data block from the cache much more quickly than it can from the peripheral, and so computer systems typically search their cache for a desired data block, and request it from the peripheral only if it is not found in the cache.

The above-described caching mechanism works well in the case of traditional mass storage peripherals, such as disk drives, in which data blocks are only read and written under the explicit control of the computer system. Such disk drives also generally have large enough amounts of memory to store the tables that implement the file system, as well as the data blocks for all the files. However, certain intelligent mass storage peripherals, such as one described in the above-referenced co-pending and commonly owned patent application by Holcomb et al., may dynamically create, delete, or rearrange data blocks independent of the explicit control of the computer system. As a result, the computer system can no longer be assured that the data blocks in its cache match the data blocks on the peripheral, and incorrect operation can result when the computer system reads cached files rather than obtaining files from the peripheral. In order to ensure proper operation, the peripheral must inform the computer system each time it dynamically creates, deletes, or rearranges data blocks, and the computer system must delete and rebuild the cache and other file system tables. Some computer systems provide a mechanism for the peripheral to so inform the computer system; however, the actions to delete and rebuild the cache and other file system tables can be time-consuming and inefficient. Other computer systems do not support such a mechanism at all.

A related limitation of non-traditional peripherals is that they may not contain sufficient memory to store all the data blocks needed to provide a large file system. As a result, the number and size of files stored on the peripheral may be disadvantageously limited, thus requiring the peripheral to dynamically delete certain files and create others, and giving rise to the previously discussed synchronization problem between the computer system and the peripheral.

Accordingly, it would be highly desirable to have a new and improved file system and method of accessing a large number of data files which allows files to be created, deleted, and rearranged without requiring the host computer system to delete and rebuild its cache and other file system tables and without requiring a large amount of memory.

SUMMARY OF THE INVENTION

In a preferred embodiment, the present invention provides a virtual filesystem capable of including a large number of data files. The virtual filesystem has a predetermined structure of directories and files, and a linear filespace. The linear filespace includes a directory region and a file allocation table region in which, as a result of the predetermined nature of the directory structure, the data blocks are calculatable upon a read request and are not required to be stored in the filesystem. The linear filespace also includes a file region having a predefined number of predefined-size files. Each of a set of lowest-level directories of the directory structure contains a single file. The particular single file in the file region that is linked to a particular lowest-level directory is preferably determined at the time when the lowest-level directory is first accessed, thus allowing a previously-unused or least-recently-used one of the files to be allocated so as to avoid the need to delete and rebuild the host's cache. The data blocks of the file are preferably dynamically generated and provided to the virtual filesystem upon request, or aliased to a file stored in an auxiliary filesystem that is read via the virtual filesystem.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein.

DESCRIPTION OF THE PREFERRED EMBODIMENT

Figure 1:
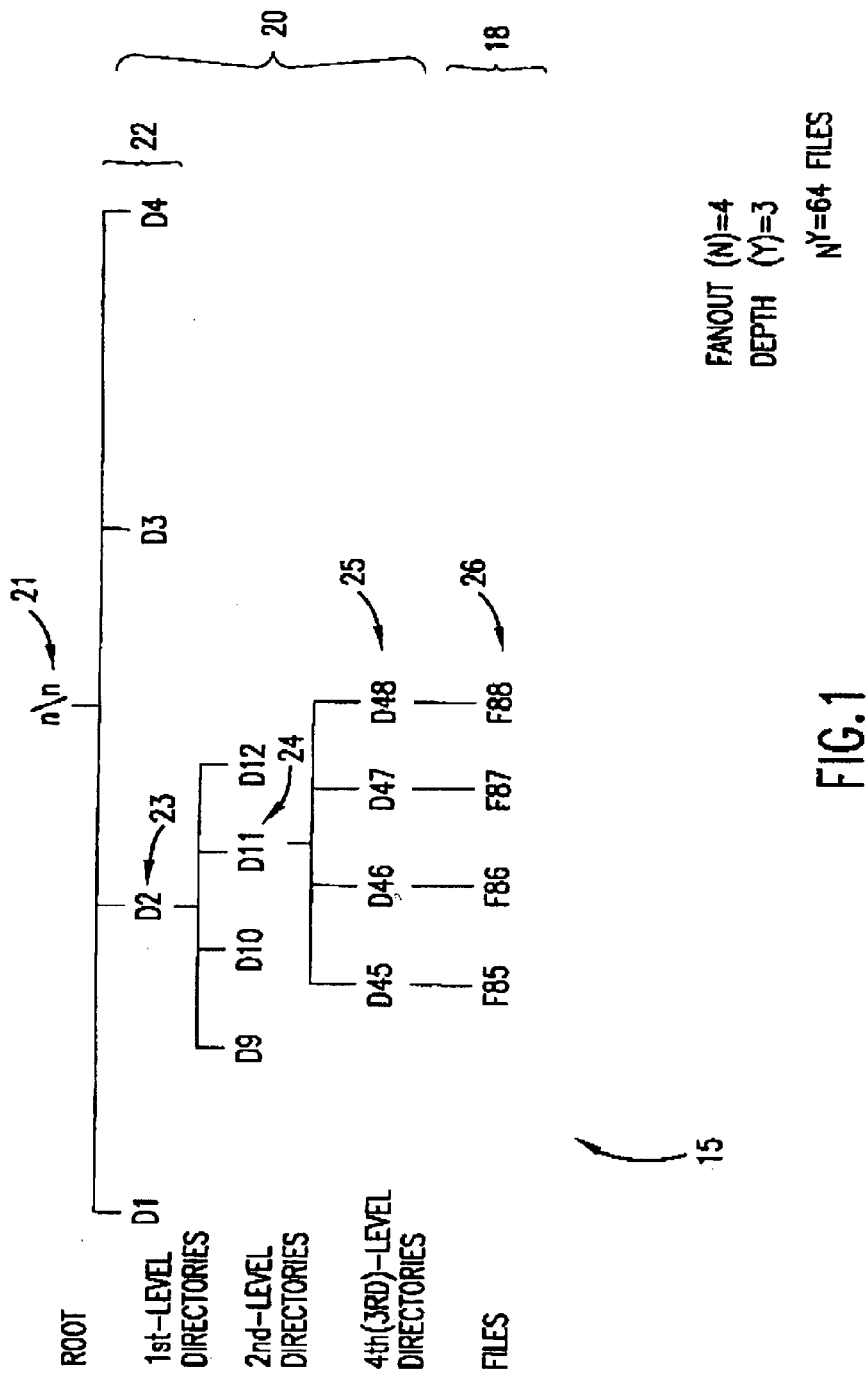
FIG. 1 is a schematic representations of an exemplary predefined file structure for a virtual filesystem according to the present invention.

Referring now to the drawings, there is illustrated a virtual filesystem 10 (also referred to as a "VFS") constructed in accordance with a novel method 100 of reading data from an apparatus 50 on which the filesystem 10 is implemented. The virtual filesystem 10 advantageously provides a large virtual filespace that can be implemented in only a relatively small amount of memory by predefining the directory hierarchy such that data blocks corresponding to the directories (and an associated file allocation table, also referred to herein as a "FAT") can be algorithmically calculated, and by binding data files to the directory hierarchy only at or near the time of use such that data blocks corresponding to the data files can be dynamically generated at or near the time of access. The present invention is particularly applicable to FAT-based file systems such as the widely-used MS-DOS file system that is well known to those skilled in the art.

As is understood by those skilled in the art, a filesystem is a structure of directories, files, and other internal information which an operating system uses to locate and access these directories and files. The directories are typically organized in a directory hierarchy in which some directories are related to other directories in a parent-and-child tree structure. Files are located within directories. The data structures that comprise the filesystem occupy a preferably linear filespace in memory. A virtual filesystem is one in which the directories and files appear to exist in a linear filespace when viewed by a host computer or other device which is external to the filesystem, but in actuality may not exist in linear filespace or may even not exist in physical memory at all until the host computer requests the filesystem to perform an operation on a directory or file.

Figure 3:
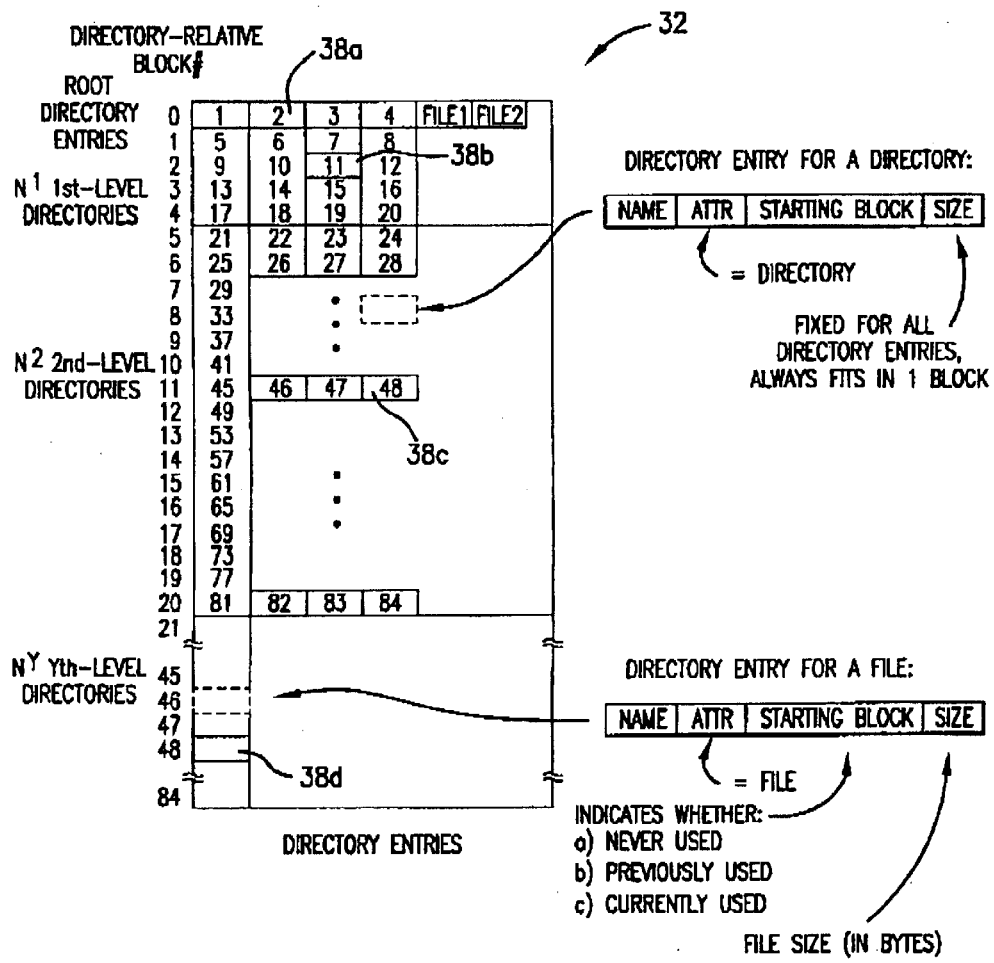
FIG. 3 is a more detailed schematic representations of an exemplary directory region of the filespace of FIG. 2.

As is best understood with reference to the exemplary predefined file structure 15 of FIG. 1, the virtual filesystem 10 of the present invention has a predefined and fixed directory hierarchy 20, which begins at a root directory "\" 21. Below the root directory 21 is a set 22 of $1^{st}$-level directories which are subdirectories to the root directory. The exemplary directory hierarchy 20 contains four $1^{st}$-level directories, denoted D1 through D4. The number of subdirectories contained below a higher-level directory is referred to as the "fanout"; the exemplary directory structure uses a fanout of four at all levels, but for clarity only one set of four subdirectories is illustrated in FIG. 1 for each level. $1^{st}$-level directory D2 23 contains four $2^{nd}$-level directories, which are denoted D9 through D12. $2^{nd}$-level directory D11 24 contains four $3^{rd}$-level directories, which are denoted D45 through D48. Both the $1^{st}$-level directories and the $2^{nd}$-level directories are considered to be intermediate-level directories in that they have both a higher-level ("parent") directory and lower-level ("child") directories. The Yth-level directories (in this exemplary hierarchy 20 the $3^{rd}$-level directories) are the lowest-level directories in the directory hierarchy 20. Each Yth-level directory according to the present invention contains one of a set 18 of predefined file placeholders, such as directory D48 25 contains the file placeholder F88 26; the lowest-level directories have a parent directory but no child directories. The significance of the directory and file labeling used in FIG. 1 will become apparent when FIG. 3 is discussed subsequently.

The directory fanout N and hierarchy depth Y can be advantageously chosen to provide a virtual filesystem having a desired number of files. The number of files is calculated according to the formula $N^Y$. The exemplary hierarchy 20 with a fanout of 4 and a depth of 3 thus provides $4^3=64$ files. The preferred embodiment has a fanout of 32 and a depth of 4, and thus provides $32^4=1,048,576$ files. While the fanout N and the depth Y may be different at each level and branch of the directory hierarchy, in the preferred embodiment they are the same at all levels and branches, as will become apparent when the method of the present invention is discussed subsequently.

Figure 2:
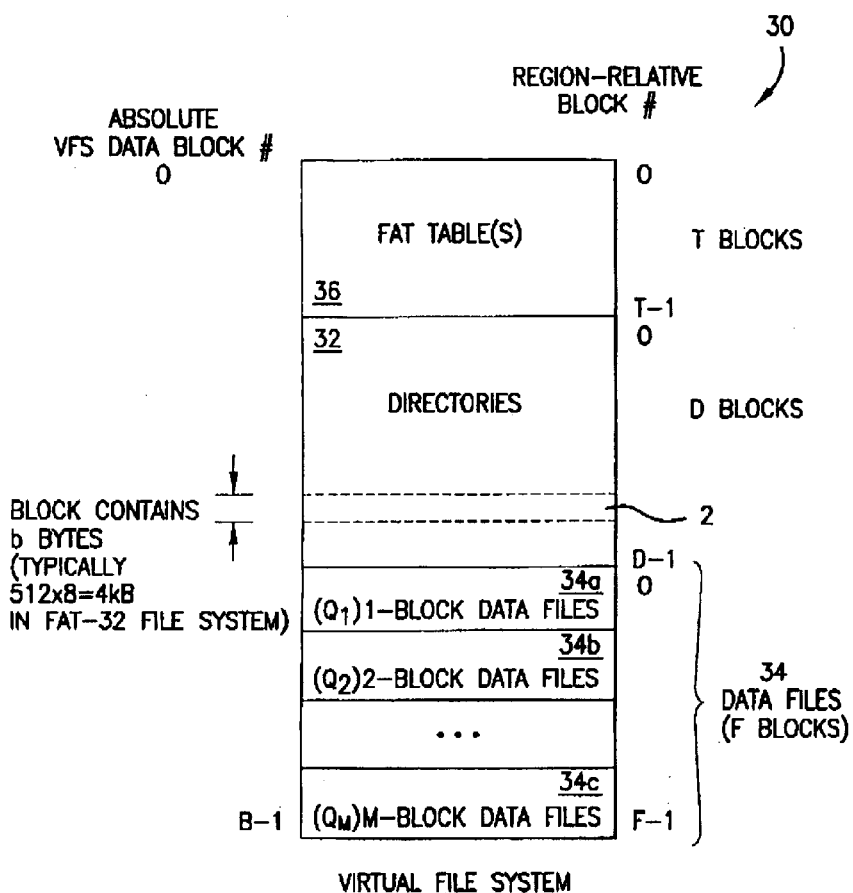
FIG. 2 is a schematic representations of the filespace of the virtual filesystem of FIG. 1.

As best understood with reference to FIG. 2, the virtual file system occupies a filespace 30 which contains B logical data blocks, such as data block 2. Each data block contains b bytes. In the commonly-used FAT-32 file system well known to those skilled in the art, each block typically contains 4 k bytes of data a data block can be further divided, typically according to the type of physical media on which the filesystem is implemented, but such discussions will be omitted here since they are also well known in the art and are not germane to the present invention.

The data blocks of the virtual filesystem 10 are preferably organized sequentially. The data blocks can be requested, typically by block number, from the virtual file system 10 by a host computer (not shown) or other device. The filespace 30 is logically divided into several contiguous regions. A directory region 32 of D blocks in size predefines the directory hierarchy of the virtual filesystem 10, as explained heretofore.

The filespace 30 also contains a number of file regions 34a,b,c which in total occupy F blocks of the filespace 30. Each file region 34a,b,c predefines a quantity of data files of a predetermined number of data blocks in size. File region 34a defines a quantity $Q_1$ of data files, each of which is one block in size. File region 34b defines a quantity $Q_2$ of data files, each of which is two blocks in size. File region 34c defines a quantity $Q_M$ of data files, each of which is M blocks in size. The size of each file region is determined by the quantity of files and the block size of each file. The number of file regions, the quantity of files in each region, and the block size of the files in each region are not limited by the present invention but rather are design choices available to the filesystem 10 designer.

The filespace 30 also contains one or more FAT regions 36. Each FAT region 36 predefines a file allocation table of T blocks in size for locating in the filespace 30 all the data blocks for the directories and the data files. According to the present invention, and as will discussed subsequently in greater detail, these regions are organized so as to allow the data blocks in the directory region 32 and the FAT region 36 to be algorithmically calculated when the filesystem 10 is read in order to reduce the amount of physical memory required to contain the filesystem 10.

Considering now in further detail, and with reference to FIG. 3, the directory region 32, the directory region 32 contains directory entries. Each directory entry contains different fields which identify (at a minimum) the name, the starting block number, the attributes of the entry (in particular, whether it represents a child directory or a file), and the size of each file or child directory. Directory entries describe the contents of each individual directory of the directory hierarchy 20. In the preferred embodiment, the directory entries for each directory of the hierarchy 20 are contained in a separate data block whose position in the filespace 30 is calculable from the directory hierarchy 20. To illustrate using the exemplary directory hierarchy 20 of FIG. 1, the directory entries for the root directory 21 are assigned to block 0 of directory region 32. Block 0 contains four directory entries, which correspond to the directory entries for the four $1^{st}$-level directories (D1 through D4) of the hierarchy 20. The numbers shown within each block of the directory region 32 of FIG. 3 represent the value of the starting block field of the particular directory entry in the block, and correspond to the directory numbers used in the directory hierarchy 20. For example, the second entry 38a of block 0 corresponds to $1^{st}$-level directory D2, and indicates that the directory entries for directory D2 may be found in block 2. The third entry 38b of block 2 corresponds to $2^{nd}$-level directory D11, and indicates that directory entries for directory D11 may be found in block 11. The fourth entry 38c of block 11 corresponds to Yth-level directory D48, and indicates that directory entries for directory D48 may be found in block 48. The first (and only) entry 38d of block 48 corresponds to a file placeholder. The file placeholder may or may not have an actual file associated with it at any particular point in time. The value of the starting block field for the file entry indicates the state of the file's existence. One predefined value indicates that no file has ever been created in directory D48, while a different predefined value indicates that a file was previously created in directory D48 but the file is no longer in existence. If the starting block field contains a value between 0 and F-1, then it indicates that an associated file currently exists, and the starting block field value is the block number in the file region 34 at which the file data is located. As will be described subsequently in further detail, a file placeholder for a Yth-level directory is bound to a particular data file only when a particular Yth-level directory is first accessed.

The above-described manner of storing N-ary (for example, binary, trinary, etc.) trees such as the directory hierarchy 20 in an array is well known to those skilled in the art. Because the directory hierarchy 20 is fixed and the positions in the filespace 30 of the data blocks for any particular directory are calculable, as will be described subsequently in further detail, a VFS 10 according to the present invention does not need to store the data for the directory region 32, but rather can algorithmically calculate the data for any particular data block when requested by the host computer.

Figure 4:
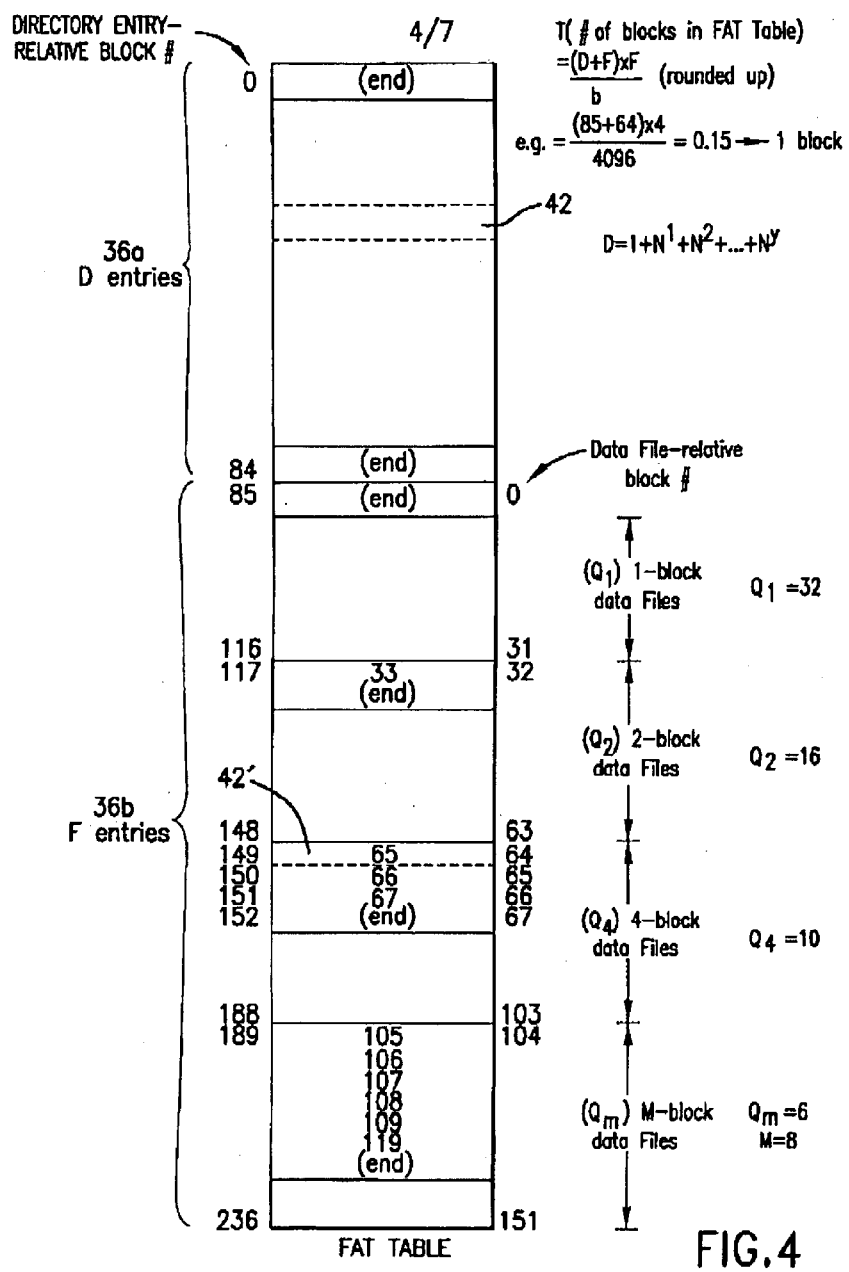
FIG. 4 is a more detailed schematic representations of an exemplary file allocation table region of the filespace of FIG. 2.

Considering now in further detail the FAT region 36, and with reference to FIG. 4, in many filesystems the data blocks of a file or directory which spans more than one block are not located contiguously in the filespace 30. While a directory entry, as has been explained previously, indicates the starting block at which data for a directory or file will be found, it does not indicate the location of any additional data blocks. The FAT table provides this linkage between the starting block and any additional blocks. Because the directory hierarchy, and the number and size of files, are predetermined in the VFS 10 of the present invention, the contents of the FAT region are correspondingly calculable algorithmically.

The size of the FAT region 36 is determined by the number of data blocks contained in the VFS 10. The FAT 36 contains a FAT entry 42 for each data block in the system. Each FAT entry 42 must be of a size large enough to contain a value that represents the largest block number in the combined directory 32 and file 34 regions (i.e. the value of D+F). For example, the FAT-32 file system uses a four byte FAT entry 42, which is sufficient to address up to $2^{32}$=4, 294,967,296 blocks.

The FAT region 36 includes a directory FAT subregion 36a and a file FAT subregion 36b. Since, as previously discussed, each directory occupies a single data block in the directory region 32, the number of FAT entries 42 in the directory FAT subregion 36a is equal to the number of directories in the directory hierarchy 20. For instance, in the exemplary directory hierarchy 20 of FIG. 1 in which N=4 and Y=3, there is one root directory, $N^1$=4 $1^{st}$-level directories, $N^2$=16 $2^{nd}$-level directories, and $N^3$=64 Yth ($3^{rd}$)-level directories, for a total of 85 directories; therefore, there are 85 FAT entries 42 in the directory FAT subregion 36a.

With regard to the file FAT subregion 36b, different files can occupy a different number of data blocks in the file region 34. However, according to the filesystem 10 of the present invention, and as previously described, the number of files and the size of each file are predetermined, so the number of FAT entries 42 required for the FAT subregion 36b is algorithmically calculable. For instance, in the exemplary directory hierarchy 20 of FIG. 1 which contains $N^Y=4^3$=64 files, assume that 32 ($Q_1$) of the files are 1-block files, 16 ($Q_2$) are 2-block files, 10 ($Q_3$) are 4-block files, and 6 ($Q_4$) are 8-block data files. Therefore, 32×1=32 blocks are required for the 1-block files, 16×2=32 blocks are required for the 2-block files, 10×4=40 blocks are required for the 4-block files, and 6×8=48 blocks are required for the M-block files (where M=8); for a total of 32+32+40+48=152 blocks. Therefore, the file FAT subregion 36b will contain 152 FAT entries 42.

The content of a FAT entry 42 for a particular data block in the directory region 32 or the file region 34 specifies whether the data for that directory or file continues in another data block and, if so, at which block the data continues. If the FAT entry 42 contains a value that corresponds to another block number in the filesystem 10, then the data continues at that block number. If the FAT entry 42 contains a predefined "end-of-chain" value that does not correspond to a block number in the filesystem 10, then the data does not continue in any additional block. With reference to the exemplary FAT table 36 of FIG. 4, the starting block of a 4-block data file is located at datafile-relative FAT entry #64 42'. In the exemplary file FAT subregion 36b of FIG. 4, FAT entry #64 42' contains the value 65, indicating that the 4-block data file continues at data block #65. Similarly, FAT entry #65 contains the value 66 indicating that the 4-block data file continues at data block #66, and FAT entry #66 contains the value 67 indicating that the 4-block data file continues at data block #67. Since data block #67 is the last of the four blocks in the chain, FAT entry #67 contains the "end-of-chain" marker.

Figure 5:
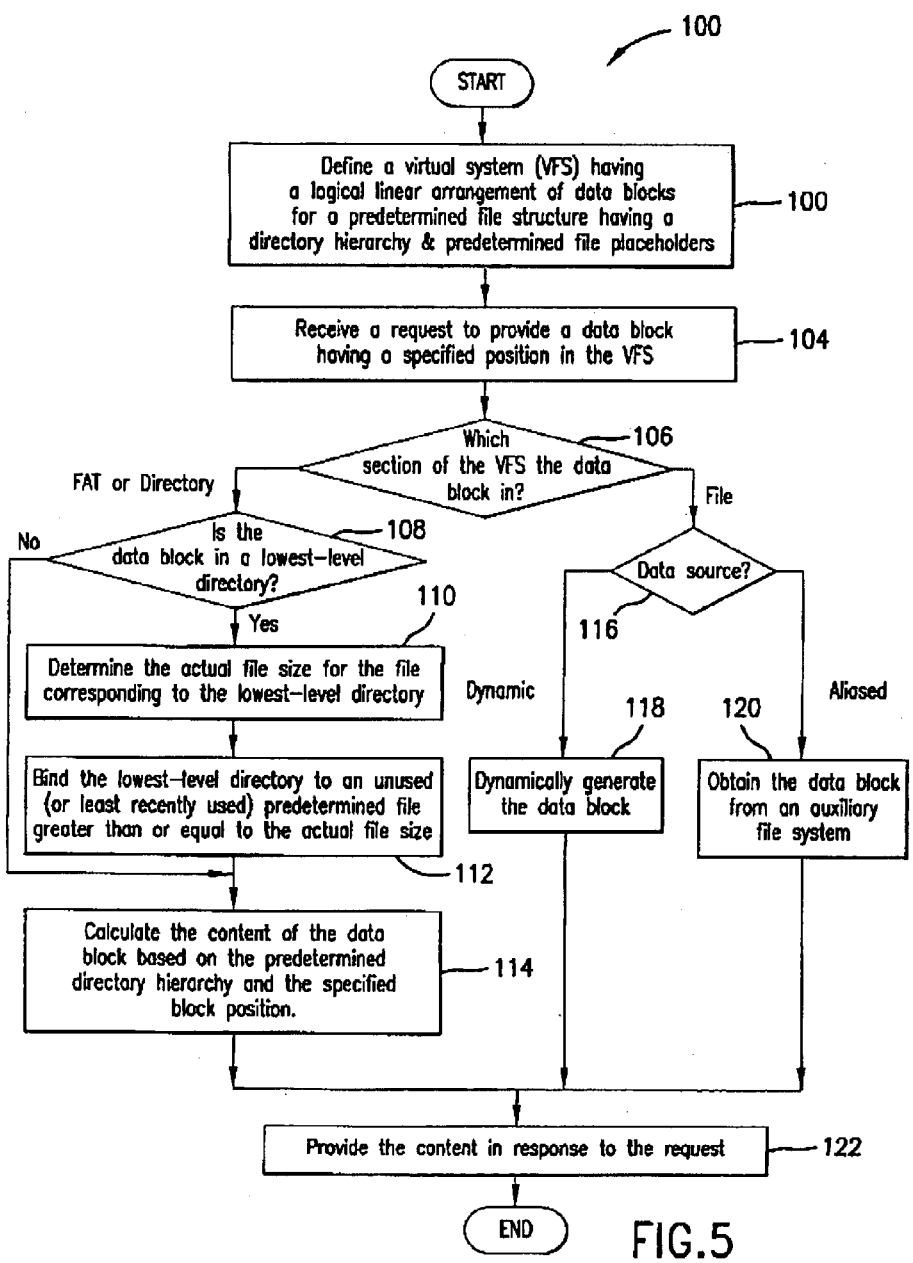
FIG. 5 is a flowchart of a method for reading data from the virtual file system of FIG. 1.
Figure 6:
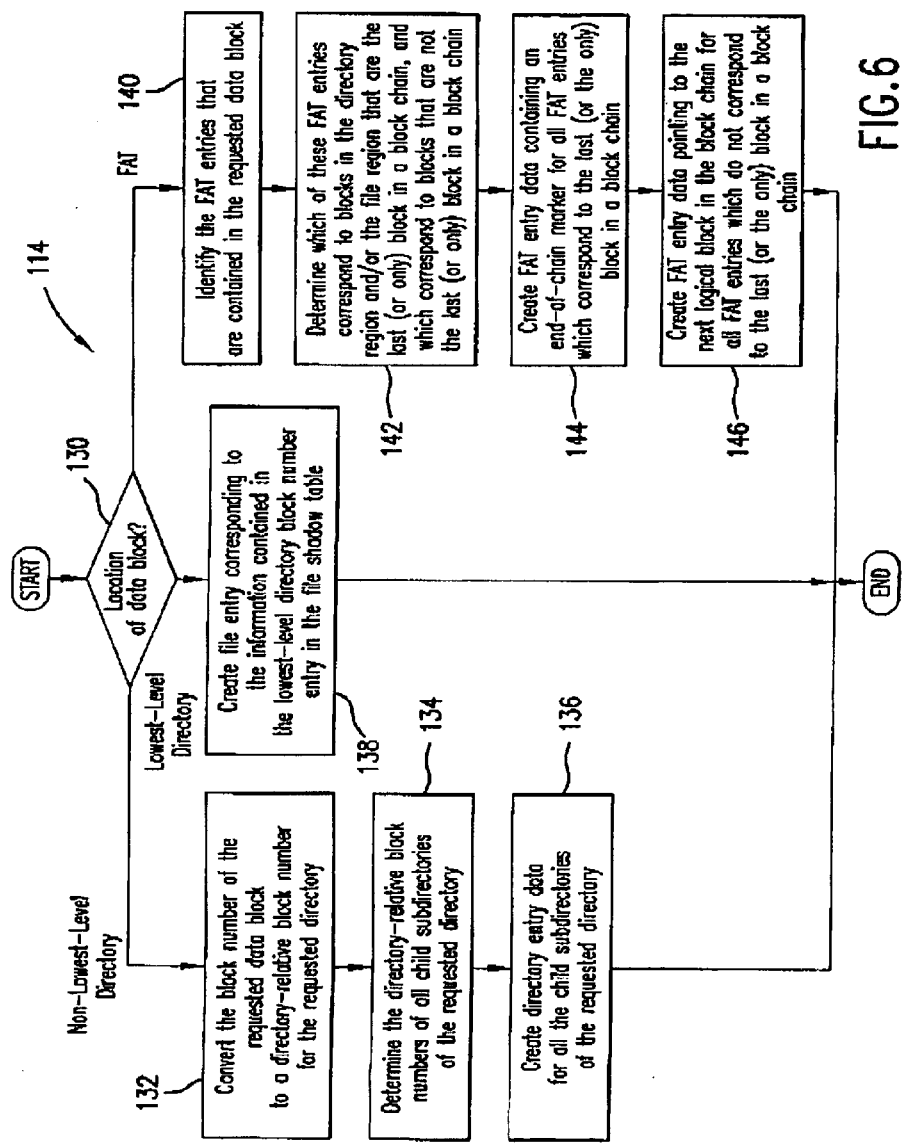
FIG. 6 is a more detailed flowchart of a data block calculation portion of the flowchart of FIG. 5.

Considering now a novel method 100 of reading data from the virtual filesystem 10, and with reference to FIG. 5, the method 100 begins at 102 by defining a virtual file system 10 having a filespace 30 containing a logical linear arrangement of data blocks for a predetermined file structure 15 which includes a directory hierarchy 20 and a set of placeholders for predetermined file 18. At 104, a request to provide a data block 2 having a specified position in the VFS 10 is received, typically from the host computer connected to the VFS 10. At 106, the section of the VFS 10 in which the data block 2 is located is determined. If the data block 2 is located in the FAT region 36 or the directory region 32 ("FAT or Directory" branch of 106), then the method continues at 108.

If the data block 2 is in the FAT region 36, or if the data block 2 is in the directory region 32 but corresponds to the root directory or one of the intermediate-level directories in the directory hierarchy 20 ("No" branch of 108), then at 114 the content of the data block 2 is calculated based on the predetermined directory hierarchy 20 and the specified block position, and at 116 the content is provided to the host computer in response to its request. The algorithm by which the data block content is calculated will be described subsequently; calculation of the data block content is advantageously enabled by the novel predefined organization of the file structure 15 and filespace 30 of the VFS 10.

If the data block 2 is in the directory region 32 and corresponds to one of the lowest-level directories in the directory hierarchy 20 ("Yes" branch of 108), then at 110 the actual amount of data to be contained by the file corresponding to the lowest-level directory is determined. This is preferably done by a process external to the virtual filesystem 10 which has previously associated the file placeholder with the data, as will be described subsequently with reference to the virtual filesystem apparatus 50. Once this actual file size in bytes is known, at 112 the lowest-level directory is bound to an unused (or least recently used) predetermined file having a maximum file size which is greater than or equal to the amount of data, and the method continues at 114. Typically the smallest predetermined file of sufficient size to contain the data will be bound to the particular lowest-level directory.

By calculating data blocks 2 in the FAT region 36 and the directory region 32, the present invention advantageously minimizes the amount of physical memory that is required by the virtual filesystem 10, particularly as large numbers of files and large file sizes are included in the filesystem 10.

If the data block 2 is located in the file region 34 ("File" branch of 106), then at 116 the data source for the file is determined. If the data is to be dynamically generated ("Dynamic" branch of 116), then at 118 the content of the data block 2 is dynamically generated, preferably by a process external to the virtual filesystem 10, and at 122 the content is provided to the host computer in response to its request. If the data is to be aliased from another data memory such as an auxiliary file system 70 external to the VFS 10, then at 120 the content of the data block 2 is obtained from the auxiliary file system 70, and at 122 the content is provided to the host computer in response to its request.

By dynamically generating data blocks 2 as they are requested, or by obtaining data blocks 2 from an auxiliary file system 70 already present in an apparatus in which the virtual filesystem 10 is included, the present invention advantageously minimizes the amount of physical memory that is required by the virtual filesystem 10, particularly as large numbers of files and large file sizes are included in the filesystem 10.

The method 100 is preferably implemented in firmware and/or software as a program of instructions contained on a program storage medium such as a ROM, CD-ROM, floppy disk, and the like, executable by a computing apparatus (not shown) incorporated within the virtual filesystem 10. Such an implementation is well known to those skilled in the art. The program of instructions can be organized into a number of logical segments for performing the steps of the method 100 heretofore described to implement the file structure 15 and filespace 30 that have also been described.

Considering now in further detail the calculating 114 of the contents of a data block 2 in the FAT region 36 or directory region 32 based on the predetermined directory hierarchy 20, and as best understood with reference to FIGS. 2, 3, 4, and 6, at 130 the location of the requested data block within the FAT region 36 or directory region 32 of the filespace 30 is determined. If the requested data block is in the directory region 32 and corresponds to any directory other than a lowest-level (Yth level) directory, then at 132 the block number of the requested data block is converted to a directory-relative block number for the requested directory. At 134, the directory-relative block numbers of all child subdirectories of the requested directory are determined, preferably by calculating the block numbers of the child subdirectories based on the depth and fanout of the predetermined directory hierarchy 20 according to a conventional algorithm known to those skilled in the art for traversing an N-ary tree stored in an array. For example, if the requested block corresponds to directory-relative block #6, child subdirectories #25, #26, #27, and #28 are identified. Once the appropriate child subdirectories have been determined, then at 136, directory entry data for these child subdirectories of the requested directory are created.

If the requested data block is in the directory region 32 and corresponds to a lowest-level (Yth level) directory, then at 138 directory entry data representing a file is created. This data is derived from information contained in an entry 62 in the file shadow table 60 which corresponds to that lowest-level directory (the shadow table 60 and its entries 62 will be subsequently described in further detail with reference to FIG. 7). For example, if the requested block corresponds to directory-relative block #48, then directory entry data 38d representing the file contained in the lowest-level directory associated with block #48 is created.

If the requested data block is in the FAT region 36, then at 140 the FAT entries contained in the requested data block are identified. In the preferred embodiment, these entries are readily calculated based on the size of the data block and the size of each FAT entry. Each FAT entry 42 refers to a data block 2 in the directory region 32 or the file region 34. At 142, it is determined which of these FAT entries correspond to blocks that are the last (or only) block in a block chain, and which correspond to blocks that are not the last (or only) block in a block chain. In the preferred embodiment, this can be readily calculated based on the organization of the filespace 30, since all directories occupy one data block, and the number of data files of each size M are predetermined. At 144, FAT entry data containing an end-of-chain marker is created for all FAT entries which correspond to the last (or the only) block in a block chain, while at 146 FAT entry data pointing to the next block in the chain is created for all FAT entries which do not correspond to the last (or the only) block in a block chain. For example, if the requested data block includes FAT entries for datafile-relative blocks #64 through #67, the FAT entry created for block #64 will point to block #65, while the FAT entry created for block #67 will contain the end-of-chain marker.

Figure 7:
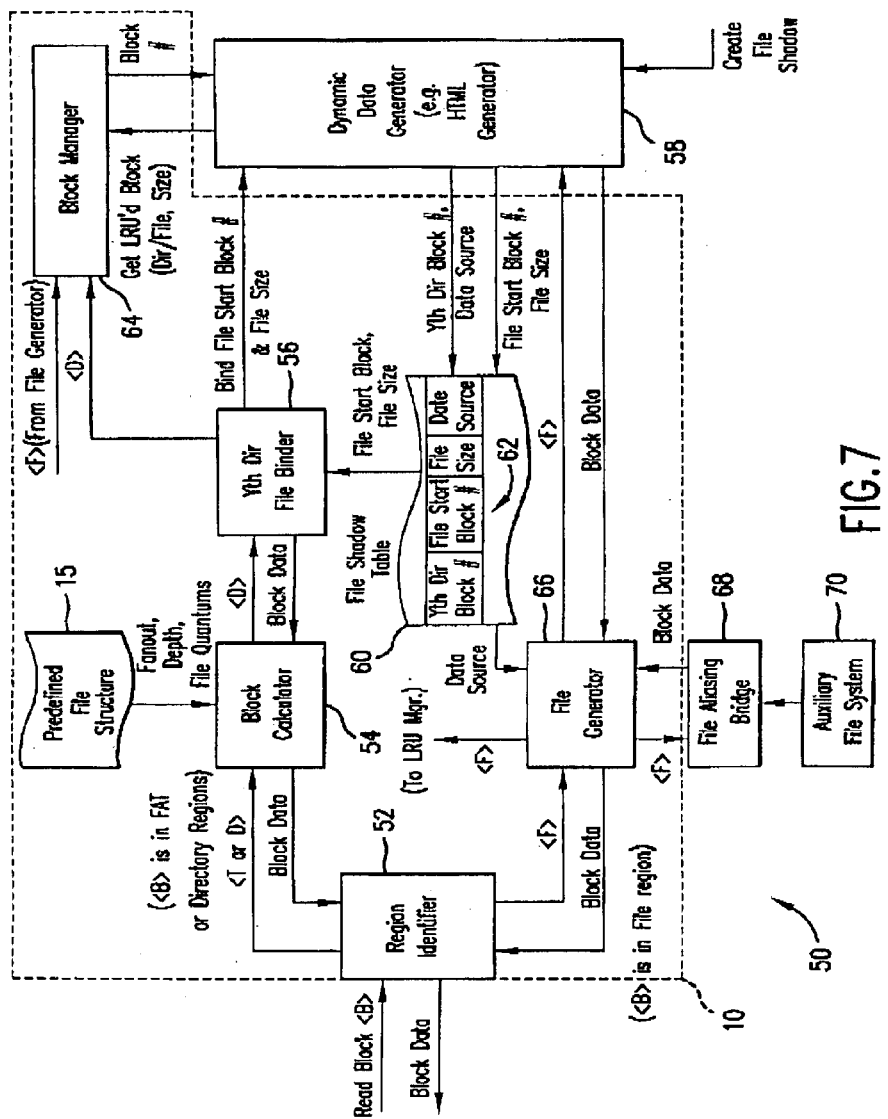
FIG. 7 is a block diagram of an apparatus for providing the virtual file system of FIG. 1.

The present invention can also be embodied, as best understood with reference to FIG. 7, as an apparatus 50 which incorporates a virtual file system 10 to provide a block-oriented data source that can be accessed from a host computer (not shown). The VFS 10 further includes a region identifier 52 which receives "Read Block <B>" requests from the host computer, where <B> is the absolute data block number B in the VFS 10. The region identifier 52 determines whether block B corresponds to a block in the FAT region 36 or directory region 32 and can therefore be calculated as previously described, or whether block B corresponds to a block in the file region 34 and therefore file data must be obtained as previously described. In the preferred embodiment, the region identifier 52 converts the absolute block number B into a block number relative to the region 32,34,36 to which the block belongs. If the block is in the FAT region 36 or the directory region 32, a block calculator 54 which has knowledge of the predetermined file structure 15 along with the fanout N, depth Y, file quantums Q, and the number of blocks associated with each file quantum Q calculates the contents of the requested data block. If the block number corresponds to a Yth-level directory, a Yth-directory file binder 56 sends a request to a dynamic data generator 58 to bind a file shadow 62 in a file shadow table 60 to a particular predefined file of a given size in the filesystem 10.

The file shadow 62 has typically been previously created by an asynchronous request made to the dynamic data generator 58 by another module (not shown) of the apparatus 50. Examples of such requests are described in the above-referenced co-pending U.S. patent application to Holcomb et al. At the time the file shadow 62 is created, the amount of data to be associated with the shadow 62 may not be known, and therefore the file size (and in turn the file start block location in the file region 34) for the file cannot be known; the file shadow 62 thus typically contains only the Yth directory block number and a data source address or identifier at the time the shadow 62 is created. However, when the Yth directory is read, it is an advance notification that a subsequent request for the single file located in that Yth directory is in all probability imminent. In addition, in the preferred embodiment the size of the file must also be provided in the data block 2 returned for the Yth directory. Once the dynamic data generator 58 determines the file size, a particular predefined file that is at least as large as the file size can be selected, and therefore the file start block number and the file size fields in the shadow 62 are filled in and the particular file is bound to the Yth directory at that time.

In order to eliminate or minimize any possibility that the host computer may think it already contains a particular data block in its cache memory (not shown) and thus not request it from the apparatus 50, the apparatus 50 preferably does two things. First, the dynamic data generator 58, when processing a request to create a file shadow 62, establishes a pathname that has never been used before (by choosing a Yth directory block that has never been used before. And second, when processing a request to bind a file shadow 62 to a file, the dynamic data generator 58 selects a file that has never been used before. Because the physical memory size of the virtual filesystem 10 is largely insensitive to the number and sizes of the files that the filesystem 10 contains, the virtual filesystem 10 for a particular apparatus 50 can be chosen so as to minimize any chance that a Yth-level directory or a file need ever be used twice. However, the preferred embodiment of the apparatus also includes a block manager 64 which assigns Yth-level directories and files upon request. The block manager 64 keeps track of the usage of Yth-level directories and files by receiving notification from the Yth-directory file binder 56 and the file generator 66 as blocks are requested by the host computer. If the apparatus 50 runs out of unused directories or files, the block manager 64 ensures that a least recently used one is assigned in the expectation that any previous information about that directory or file has already expired from the host computer's cache. The algorithms used by the block manager 64 are similar to those used in memory management and garbage collection, and are well known to those skilled in the art.

If the requested block B is in the file region 34, a file generator 66 searches the file shadow table 60 to locate the file shadow 62 associated with the block. The data source field of the file shadow 62 is then used by the file generator 66 to determine the source of the data. If the source is the dynamic data generator 58, the block is requested from the dynamic data generator 58. If the source is a file on an auxiliary file system 70, a file aliasing bridge 68 translates the requested block into the corresponding block of the file on the auxiliary file system 70. One example of the auxiliary file system 70 is the file system utilized by a Compact Flash card or PCMCIA flash card which is used, for example, to store photographic image files recorded by a digital camera.

From the foregoing it will be appreciated that the virtual filesystem provided by the present invention represents a significant advance in the art. Although several specific embodiments of the invention have been described and illustrated, the invention is not limited to the specific methods, forms, or arrangements of parts so described and illustrated. In particular, the filesystem may contain additional regions such as boot sectors, and may contain a redundant copy of the FAT region. It is also to be understood that the root directory and intermediate-level directories may contain additional predefined directories or files that have been omitted for clarity, including but not limited to a self-referencing directory (usually denoted as the"." directory) and a parent directory (usually denoted as the ". ." directory). Furthermore, while in the preferred embodiment the file size is fixed when a Yth-level directory is accessed, in some embodiments the binding may be deferred until the file itself is accessed, depending on the behavior of the host computer's operating system. The present invention may be advantageously used in a wide variety of traditional and embedded computer systems. The invention is limited only by the claims.

What is claimed is:

1. A method for reading data from a virtual filesystem, comprising:
    defining a logical arrangement of data blocks corresponding to a file structure having a predetermined hierarchy of directories, each data block further having a content;
    receiving a request to provide the content of a non-stored data block having a specified position in the logical arrangement; and
    calculating the content of the non-stored data block based on the predetermined hierarchy of directories and the specified position.

2. The method of claim 1, further comprising:
    providing the content in response to the request.

3. The method of claim 1, wherein the predetermined hierarchy of directories further includes a set of lowest-level directories, each lowest-level directory having a predetermined file placeholder, wherein the non-stored data block corresponds to a selected one of the lowest-level directories, and wherein the file structure includes a predetermined set of files, further comprising:
    binding the file placeholder for the selected one of the lowest-level directories to a corresponding one of the predetermined set of files.

4. The method of claim 3, wherein each of the predetermined set of files has a maximum file size, further comprising:
    determining an amount of data associated with the file placeholder, and
    choosing the corresponding one of the predetermined set of files so as to have a maximum file size at least equal to the amount of data.

5. The method of claim 3, further comprising:
    receiving an additional request to provide the content of an additional non-stored data block associated with the corresponding one of the predetermined set of files; and
    generating the content of the additional non-stored data block.

6. The method of claim 5, wherein the generating includes:

dynamically generating the content in response to the additional request.

7. The method of claim 5, wherein the generating includes:

obtaining the content from an auxiliary file system.

8. The method of claim 1, wherein the hierarchy has a depth of Y directory levels and a fanout of N files per directory.

9. The method of claim 1, wherein the virtual file structure provides a linear logical arrangement of the data blocks.

10. The method of claim 4, wherein the binding further comprises:

determining the actual file size;

locating a least recently used file placeholder at least equal to the actual file size; and assigning the least recently used file placeholder as the selected one of the predetermined file placeholders.

11. The method of claim 10, wherein the least recently used file placeholder is a previously unused file placeholder.

12. The method of claim 1, wherein the virtual file system includes:

a first region of data blocks representative of at least one file allocation table;

a second region of data blocks representative of a root directory;

a plurality of third regions of data blocks, each third region representative of an increasingly lower intermediate level of directories below the root directory in the hierarchy; and a plurality of fourth regions of data blocks, each fourth region representative of a set of data files having an identical block size.

13. An apparatus for providing a virtual file system, comprising:

a predefined file structure specifying a directory hierarchy and a set of data files having various maximum file sizes;

a region identifier adapted to receive a block read request for a specified data block and determine whether the specified data block corresponds to the directory hierarchy or the set of data files;

a block calculator connected to the region identifier to algorithmically calculate data for the specified block when the block corresponds to the directory hierarchy; and a file generator connected to the region identifier to provide the data for the specified block when the block corresponds to the set of data files.

14. The apparatus of claim 13, wherein the block calculator further detects whether the specified block corresponds to any of a set of lowest-level directories, the apparatus further comprising:

a dynamic data generator for establishing a file shadow corresponding to a selected one of the lowest-level directories and determining a file size for the data; and a file binder connected to the block calculator and the dynamic data generator for determining whether the specified block corresponds to the file shadow and, if so, obtaining the file size from the dynamic data generator and binding the selected one of the lowest-level directories to an appropriately-sized one of the set of data files at least as large as the file size.

15. The apparatus of claim 13, wherein a dynamic data generator is connected to the file generator and generates the data for the specified block.

16. The apparatus of claim 13, wherein the file generator is connected to a file aliasing bridge which obtains the specified block from an auxiliary file system.

17. A virtual filesystem having a filespace including a plurality of logical data blocks, comprising:

a first contiguous region in the filespace predefining a directory hierarchy of the filesystem, the hierarchy predefining an interconnected hierarchy of a root-level directory, a plurality of intermediate-level directories below the root-level directory, and a plurality of lowest-level directories below the intermediate-level directories;

a plurality of second contiguous regions in the filespace each predefining a set of data files having a predetermined number of data blocks; and a third contiguous region in the filespace predefining a file allocation table for locating in the filespace all the data blocks for the directories and the data files;

the regions organized so as to allow the data blocks in the first and third regions to be algorithmically calculated when the filesystem is read in order to reduce the amount of physical memory required to contain the filesystem.

18. The virtual filesystem of claim 17, wherein the root-level directory is linked to predetermined ones of the intermediate-level directories, and the intermediate-level directories are linked to predetermined ones of the lowest-level directories.

19. The virtual filesystem of claim 17, wherein a selected one of the set of data files is linked to a specified one of the lowest-level directories when the specified one is first accessed.

20. The virtual filesystem of claim 19, wherein the selected one of the set of data files is an unused data file.

21. The virtual filesystem of claim 19, wherein the selected one of the set of data files is a least-recently-used data file.

22. A program storage medium readable by a computing apparatus, tangibly embodying a program of instructions executable by the computing apparatus for implementing a virtual filesystem having a predefined hierarchy of directories and datafiles, only a portion of the filesystem data blocks stored in a memory readable by the computing apparatus, the medium comprising:

a first logical segment of the instructions configured to calculate a requested data block in a first region of the filesystem and representative of a predefined file allocation table associated with the directories and the datafiles;

a second logical segment of the instructions configured to calculate a requested data block in a second region of the filesystem, the data block representative of one of the directories in the predefined hierarchy; and a third logical segment of the instructions configured to provide a requested data block in a third region of the filesystem, the data block representative of at least a portion of one of the datafiles.

23. The program storage medium of claim 22, wherein the predefined hierarchy of directories includes a set of lowest-level directories, the medium further comprising:

a fourth logical segment of the instructions configured to bind a selected one of a datafiles to a specified one of the lowest-level directories when the specified one of the lowest-level directories is first accessed.

24. The program storage medium of claim 23, wherein the datafiles include a plurality of datafile subsets, each subset having a predetermined number of datafiles of an identical predetermined maximum data block size, and wherein the fourth logical segment is further configured to choose the selected datafile from one of the datafile subsets by determining the amount of data associated with the selected datafile and the datafile subsets having a larger maximum data block size.

25. The program storage medium of claim 22, wherein the third logical segment is further configured to dynamically generate the requested data block.

26. The program storage medium of claim 22, wherein the third logical segment is further configured to alias the requested data block to a corresponding data block of an auxiliary file system.

* * * * *